United States Patent [19]

Hemmelgarn

[11] Patent Number: 4,958,438
[45] Date of Patent: Sep. 25, 1990

[54] ROTARY TABLE FOR A COORDINATE MEASURING MACHINE AND METHOD OF DETERMINING THE AXIS OF TABLE ROTATION

[75] Inventor: Thomas L. Hemmelgarn, Dayton, Ohio

[73] Assignee: The Warner & Swasey Company, Cleveland, Ohio

[21] Appl. No.: 332,077

[22] Filed: Mar. 30, 1989

[51] Int. Cl.⁵ .............................................. G01B 5/03
[52] U.S. Cl. ...................................... 33/503; 33/1 M
[58] Field of Search ................ 33/1 M, 503, 504, 559, 33/561, 569, 572, 556, 558; 74/208, 813 R, 813 C

[56] References Cited

U.S. PATENT DOCUMENTS

| | | |
|---|---|---|
| 2,774,247 | 12/1956 | Knost . |
| 2,902,871 | 9/1959 | Mooar . |
| 2,912,868 | 11/1959 | Preskitt . |
| 3,433,099 | 3/1969 | Nasvytis ................................. 74/208 |
| 3,813,789 | 6/1974 | Shelton ................................. 33/503 |
| 3,831,283 | 8/1974 | Pagella et al. .......................... 33/559 |
| 4,224,840 | 9/1980 | Kraus ..................................... 74/798 |
| 4,250,763 | 2/1981 | Dangschat ............................ 74/208 |
| 4,492,036 | 1/1985 | Beckwith, Jr. . |
| 4,523,450 | 6/1985 | Herzog . |
| 4,651,426 | 3/1987 | Band et al. ............................. 33/1 M |
| 4,867,013 | 9/1989 | Braunberger ...................... 74/813 R |

FOREIGN PATENT DOCUMENTS

| | | | |
|---|---|---|---|
| 3603269 | 8/1987 | Fed. Rep. of Germany ........ 33/559 |
| 2136573 | 9/1984 | United Kingdom .................. 33/503 |
| 2207505 | 2/1989 | United Kingdom .................. 33/503 |

Primary Examiner—William A. Cuchlinski, Jr.
Assistant Examiner—D. Price
Attorney, Agent, or Firm—John R. Benefiel; Raymond J. Eifler

[57] ABSTRACT

A rotary workpiece support table (12) for a horizontal arm coordinate measuring machine (10) having a retractable datum ball (144) for determining the axis of rotation of a table top plate (36) on a table base (40). A frictional drive mechaism (38) has a drive wheel (72) urged into engagement with a perimeter surface (74) and rotates the table top plate (36), with a counterforce roller (98) neutralizing the side loading on an air spindle (116). The table base (40) is positioned on a machine base (30) and spacer (32) by a rotational connection (46) and a diametrically opposite block and cam follower connection (48) to avoid the effects of differential thermal expansion between the table base (40) and the machine base (30) and spacer (32).

10 Claims, 6 Drawing Sheets

ROTARY TABLE FOR A COORDINATE MEASURING MACHINE AND METHOD OF DETERMINING THE AXIS OF TABLE ROTATION

This invention concerns coordinate measuring machines and more particularly rotary tables for supporting workpieces during the measuring process.

In coordinate measuring machines, a probe is mounted to move to any point within a space lying above a workpiece supporting table surface, this space referred to as the measuring envelope. The probe movement is monitored by transducers producing electrical signals, such transducers typically comprising optical gratings and photosensors. The transducer signals correspond to the extent of movement of the probe along each orthogonal axis in the measuring envelope and by moving the probe between points on the workpiece, measurements can thus be made.

In horizontal arm measuring machines, the probe extends horizontally above the table surface, and the table is positioned alongside probe supporting carriages and base. In order to enable complete access to the surfaces of the workpiece, the table is rotated to cause the surfaces away from the probe tip to face the probe and to thereby be made accessible to the probe.

The effects of table rotation on the workpiece position must be precisely accounted for in making the computer calculations required to accomplish measurement of workpiece, and it is thus necessary to precisely determine the location of the axis of rotation of the table relative the workpiece position. The conventional technique for determining the rotational axis location is to install a reference feature, referred to as a datum ball on the table surface and to rotate the table through several positions, each checked by the probe.

However, if this procedure must be done after a workpiece has been positioned on the table, the workpiece must be removed a time consuming step, particularly for large and heavy workpieces.

Also, installation of the datum ball has been done manually, preventing automation of the process. The datum ball must be removed since its permanent presence in the measuring envelope would have the disadvantage of effectively reducing the usable space in the measuring envelope.

Such tables are sometimes mounted on the granite base of the machine, and it is important to avoid distortions caused by differential thermal expansion between the iron table base and the granite machine base. Such distortions tend to create nonrepeatable changes in correspondence between table movements and the associated transducer signals.

SUMMARY OF THE INVENTION

The present invention comprises a workpiece supporting table for a coordinate measuring machine which is rotationally supported on a base, with a datum ball assembly permanently mounted on the base and having a retractable datum ball which can be powered to a position within the measuring envelope to provide a reference feature. The cylinder piston is kinematically clamped to hold the datum ball in a precisely repeatable position within the measuring envelope in a fixed relationship to the table axis of rotation.

The provision of a retractable datum ball has the advantage of allowing a precisely located reference feature to be selectively moved into the measuring envelope when needed but normally is out of the way to allow full use of the measuring envelope space. This arrangement also has the advantage of eliminating the need for time consuming removal of the workpiece from the table to locate the axis of table rotation.

An air spindle is utilized to provide support for rotation of the table about a precisely located axis and an air film thrust bearing is used to support the weight of the table during this rotation.

A counterforced frictional drive powers the table rotation, including a frictional drive wheel urged against a perimeter surface of the table, with an idler wheel urged into contact with the wheel perimeter surface located diametrically opposite thereto neutralizing the bearing load. The air spindle is therefore not subjected to the force exerted by the drive wheel in order to maintain the frictional engagement.

The air spindle rotary support provides a precisely located table axis and when combined with a counterforced frictional drive has the advantage of providing a rapid, stiff response with very low drag forces.

The table is supported on a granite base by connections locating the table thereon while allowing relative thermal expansion, obtaining the advantage of avoiding distortions in the table structure which otherwise would be caused by differential thermal growth of diverse table and base materials.

DETAILED DESCRIPTION

Figure 1:
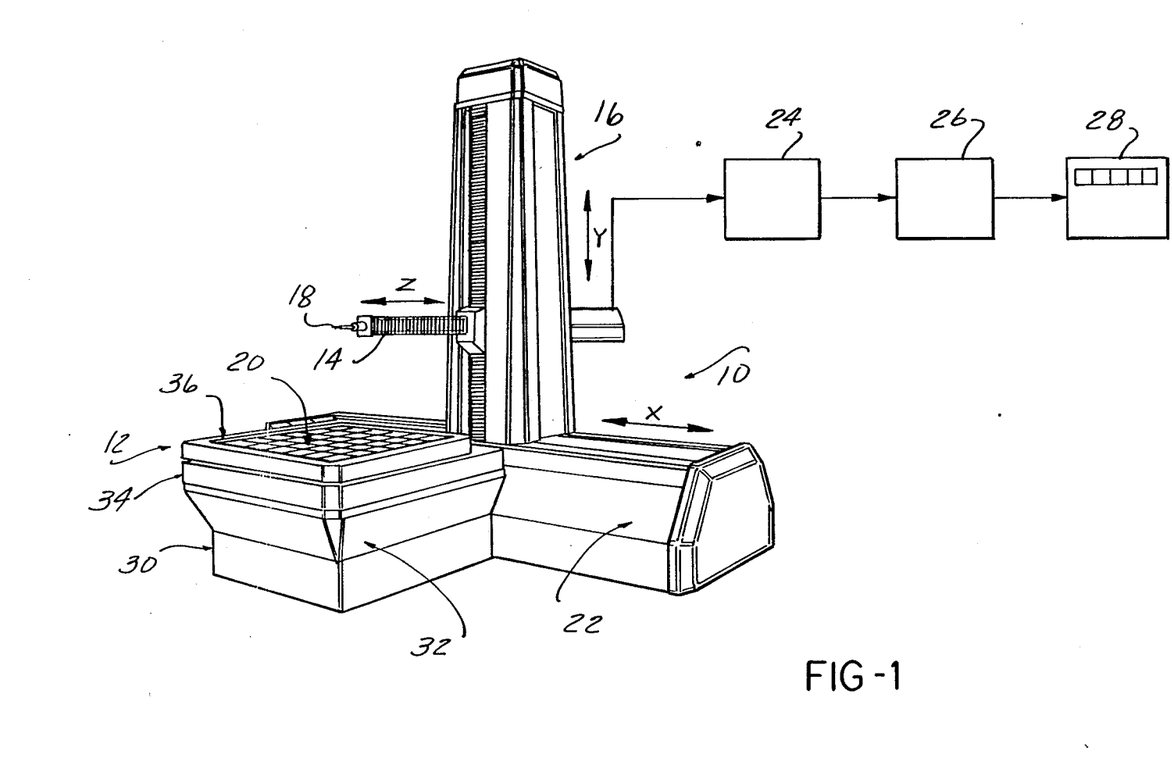
FIG. 1 is a perspective view of a horizontal arm measuring machine incorporating a rotary worktable according to the present invention.

FIG. 1 illustrates a horizontal arm coordinate measuring machine 10 utilizing a rotary worktable 12 according to the present invention.

A horizontally extending probe shaft 14 is supported for in and out movement along a Z axis on an upright column 16. The tip 18 of the probe shaft 14 extends over the upper surface 20 of the work table 12 to be able to contact points of interest on a workpiece (not shown) disposed on the table surface 20.

The probe shaft 14 is also supported on the column 16 for up and down vertical movement along a Y-axis.

The column 16 is in turn supported for horizontal movement along an X axis on a granite base 22 so that the probe tip 18 may be moved about the space above the table surface 20 within the range of motion thereof in each of the orthogonal X, Y, and Z axes.

Distance transducers 24 provide electrical signals corresponding to the extent of movement of the probe tip 18 along each axis, which signals can be stored and processed in a computer 26 and calculated dimensions displayed in an indicator device 28.

Such apparatus is generally well known in the metrology field, and details of the same are accordingly not here included since not forming a part of the present invention.

The rotary table 12 may be supported on a machine base extension 30 and spacer 32, of a suitable material such as granite, with a cover 34 surrounding the sides of the generally square top plate 36 defining the table surface 20.

Figure 2:
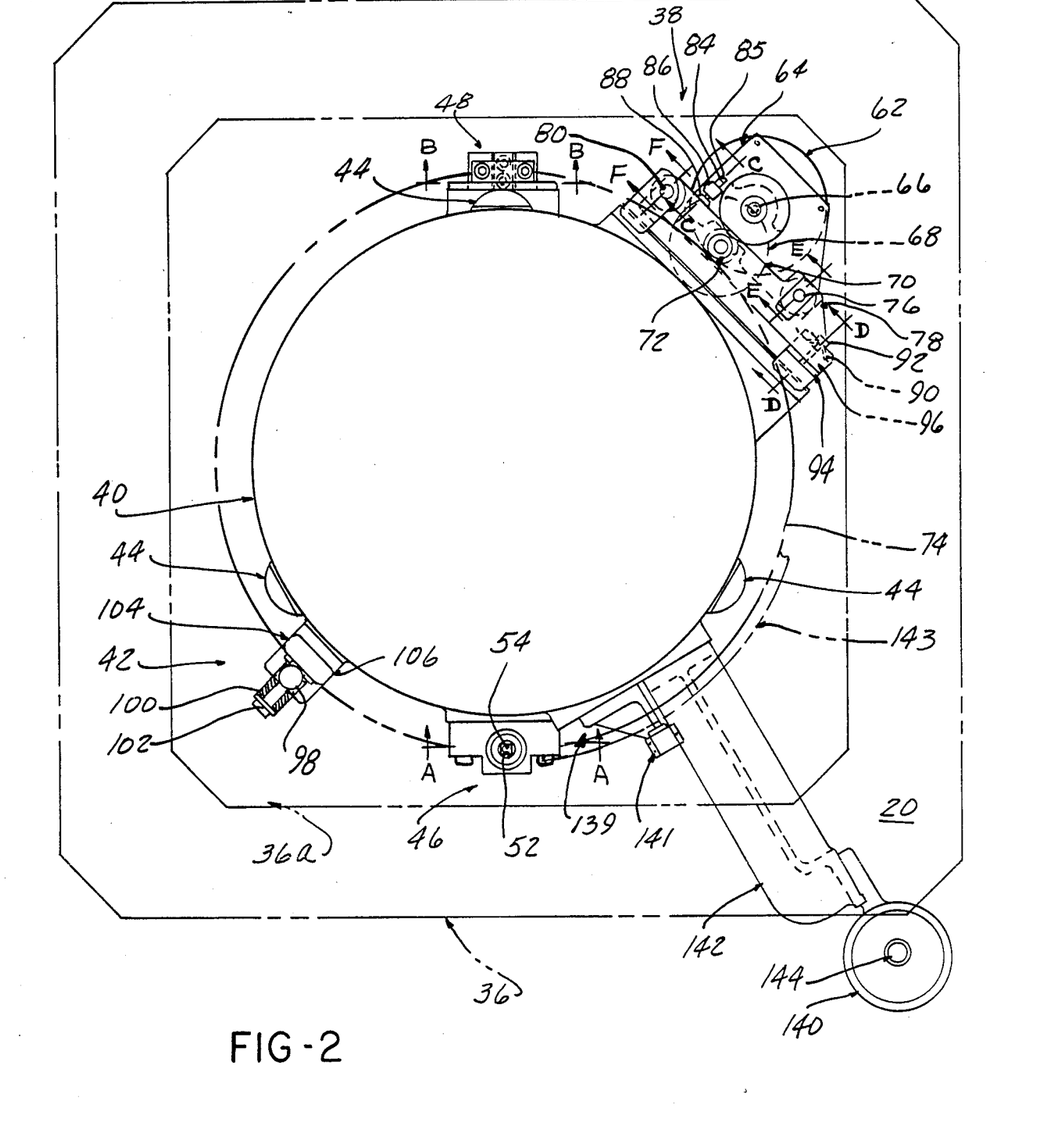
FIG. 2 is a plan view of the table base and attached components.

FIG. 2 depicts the support for the ductile iron table base 40, comprised of three equally spaced support feet 44, the table base 40 held in position on the granite spacer 32 by a combination of a pivotal connection 46 and a block and cam follower connection 48, to avoid stresses induced by differential thermal expansion between the granite spacer 32 and the ductile iron table base 40.

Figure 2A:
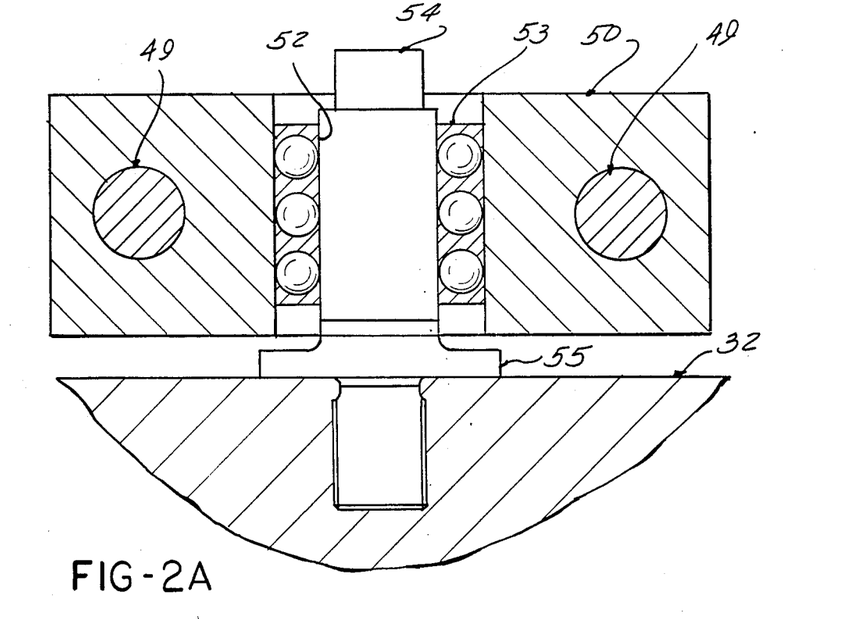
FIGS. 2A–2F are fragmentary views of sections A—A, B—B, C—C, D—D, E—E, and taken in FIG. 2.

FIG. 2A illustrates in further detail the pivotal connection 46, comprising a block 50 attached to the table base 40 with screws 49, block 50 having a bore 52 receiving a bearing sleeve 53. The bearing sleeve 53 in turn receives a pin 54 having an anchor portion 55 set into the granite spacer block 32.

Figure 2B:
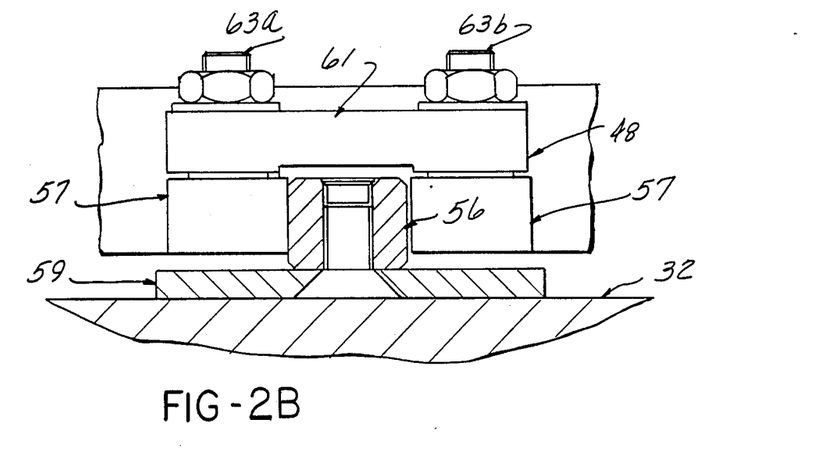

FIG. 2B shows the block and cam follower connection 48 having two cam followers 57 rotatably mounted spaced apart on plate 61 by shafts 63A, 63B, which receive a block 56 therebetween. The block 56 is fixedly mounted to the granite spacer 32 by means of a flange plate 59 directly secured to the spacer 32. Shaft 63A is straight, while shaft 63B is eccentric so that excessive side to side clearance between the block 56 and cam followers 57 can be adjusted out by rotation of eccentric shaft 63B. This arrangement of a pivotal connection 46 and block and cam follower connection 48 fixes the position of the table base 40 while allowing differential thermal expansion and contraction to occur without imposing distorting stresses on the table base 40.

FIGS. 2 also illustrates a friction gearing drive package 38, located diametrically opposite a counterforce roller assembly 42.

The friction gearing drive package 38 includes an electric drive motor 62 suspended vertically from a mounting bracket 64. A drive capstan 66 is rotated by the drive motor 62, which in turn drives a stepped friction gear 68 having a large diameter wheel 70 engaged by the drive capstan 66 and a small diameter wheel 72 engaging a flame hardened perimeter surface 74 of the table top plate 36.

Figure 2C:
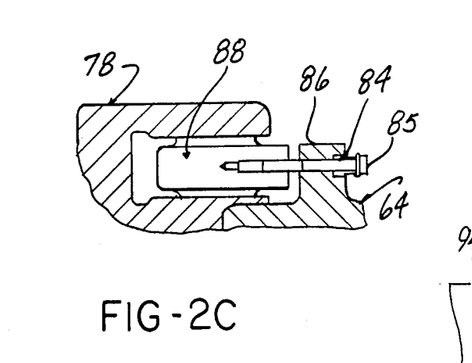

FIG. 2C shows that a spring 84 is compressed beneath a capscrew 85 passing through a lug 86 integral with mounting bracket 64, and received in a boss 88 formed on pivot plate 78 to urge the capstan 66 into frictional engagement with wheel 70. The resultant spring loading of capstan 66 allows for slight movements due to out of roundness in the friction wheels.

Figure 2D:
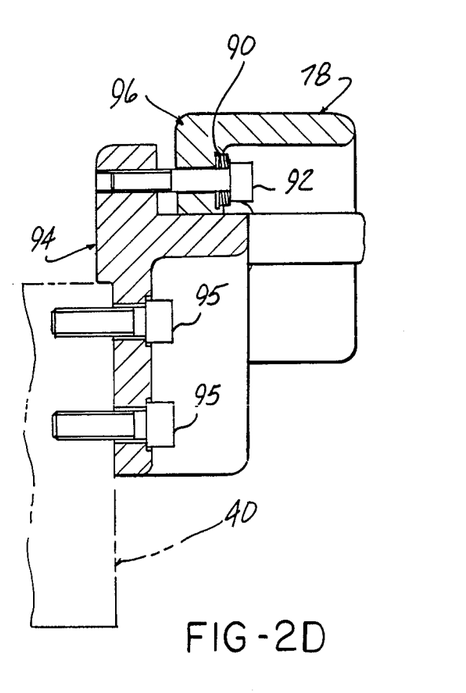

FIG. 2D shows that the pivot plate 78 is urged to increase the engagement pressure between the small diameter wheel 72 and top plate surface 74 by Belleville springs 90 beneath capscrew 92 received in mount 94, attached to table base 40 with capscrews 95 passing through a web 96 of the pivot plate 78. The Belleville springs 90 allow for slight movements due to out of roundness of the friction wheels.

Figure 2E:
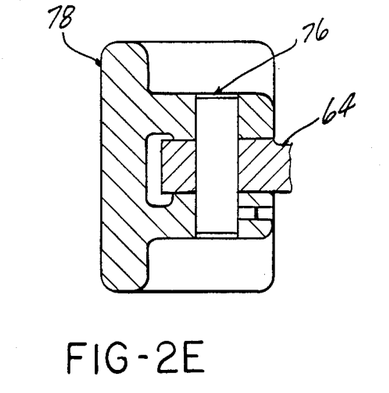

FIG. 2E shows that the mounting bracket 64 is pivotally mounted by a pin 76 to a pivot plate 78.

Figure 2F:
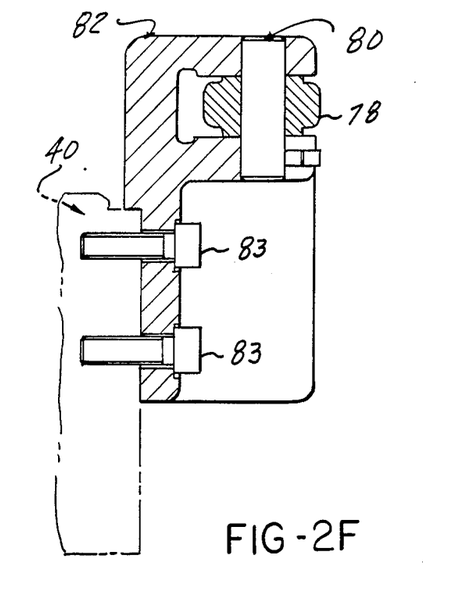

FIG. 2F shows that the pivot plate 78 is itself pivotally mounted on a pin 80 received in a bracket 82 secured to the table base 40 with capscrews 83. The pivot plate 78 rotatably supports the stepped friction gear 68 on an axle pin 69.

Figure 3:
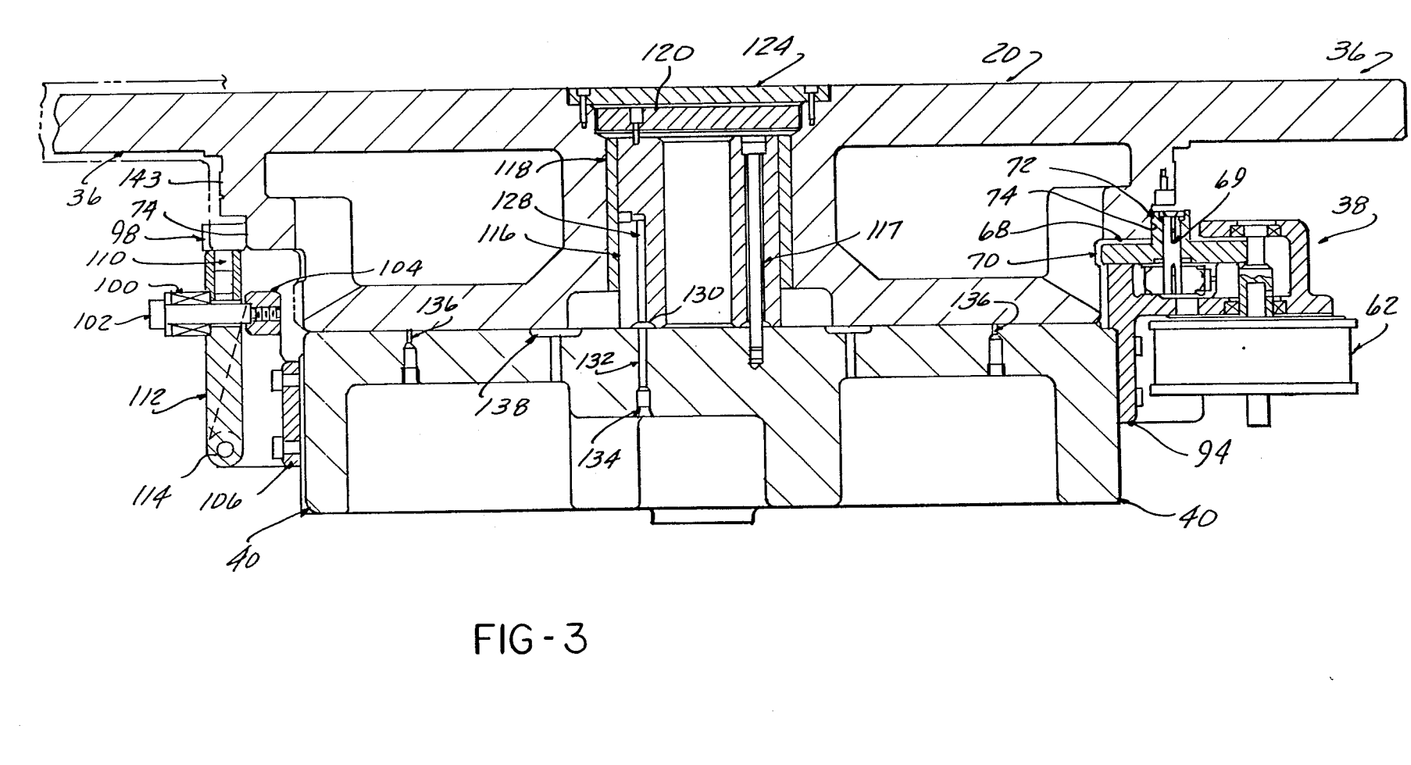
FIG. 3 is an elevational sectional view of the rotary table, depicting the drive and air bearing support components.

FIGS. 2 and 3 also show the details of the counterforce assembly 42, provided to neutralize the side force exerted by the friction gearing, which is located diametrically opposite the point of contact of the frictional gear wheel 72 with the top plate surface 74. The counterforce assembly 42 includes a counterforce roller 98 forced into engagement with the table top plate perimeter surface 74 by a spring 100 compressed beneath a shoulder screw 102 received in a web 104 formed on a mounting bracket 106 fixed to the table base 40. The roller 98 is supported on an axle pin 110 received in the free end of an elongated pivot bracket 112 pivoted at 114 at its other end to the mounting bracket 106 to allow engaging movement under the urging of spring 100. The spring also allows for slight movements due to out of roundness of the surfaces 98 and 74.

FIG. 3 also shows the air bearing means for supporting the table top plate 36 on the table base 40, including an air spindle 116 secured with cap screws 117 to the center of the table base 40 and received within a bearing sleeve 118 retained within a bore in the table top plate 36. A retainer cap 120 bolted into the spindle 116 prevents lift off of the table top plate 36 and a cover plate 124 seals off the bearing spaces.

An air supply passage 128 directs air flow into the clearance space between the air spindle 116 and the bearing sleeve 118, passage 128 receiving air flow via annulus 130 and passage 132 in the table base 40. An air supply line (not shown) connects to port 134.

An air thrust bearing arrangement is comprised of a plurality of air ports 136 formed in the table base 40, also connected to an air supply, and directing an air flow beneath the table top 36 to float the same on an air film in the manner well known in the art. A collector annulus 138 receives radially inward flow passing between the surfaces and allows the flow to exhaust out. The air flow is initiated only when the table top 36 is to be driven so that the table top 36 normally rests directly on the table base 40 when measurements are being made.

An electroptical transducer 141 juxtaposed to an optical grating 143 extending around the table top plate 36 provides electrical signals corresponding to angular movement of the table top plate 36 about its axis of rotation.

FIG. 2 further shows the telescoping datum ball assembly 140, supported on the table base 40 by an extension bracket 142 secured to the perimeter of the table base 40. The datum ball assembly 140 is thereby located just outboard of the perimeter of the largest sized table top plate 36 to be used shown in phantom (a smaller sized plate 36A may be used, as shown in phantom) to enable the datum ball 144 to be positioned above the surface 20 of the table top plate 36.

Figures 4, 5:
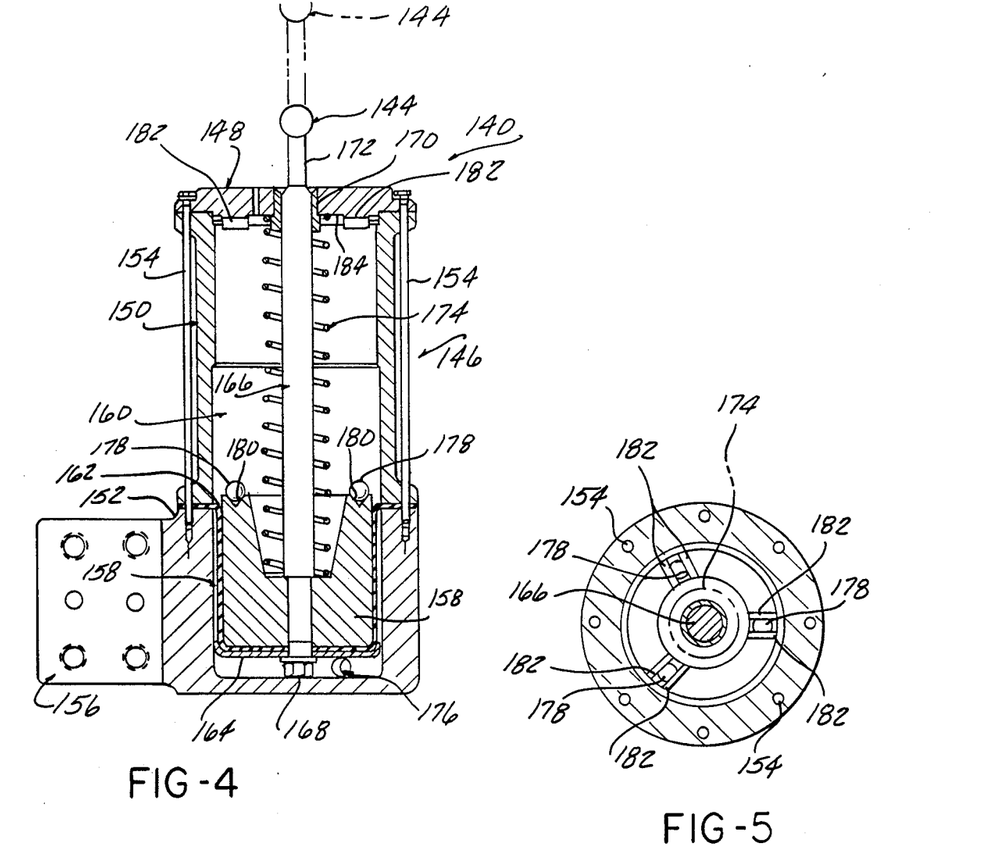
FIG. 4 is an elevational sectional view through the datum ball cylinder.
FIG. 5 is a transverse sectional view through the datum ball cylinder showing the kinematic clamping action between the piston and cylinder housing.

FIG. 4 depicts the details of the datum ball assembly 140, which is comprised of a power cylinder 146, formed by an end cap 148, a body member 150 and end cup 152 held together with bolts 154. End cup 152 is formed with a flange portion 156 attached to bracket 142.

A piston 158 is movably mounted within a cylinder bore 160, yieldably positioned in an approximate angular position by a sealing rolling lip diaphragm 162 secured with a retainer disc 164. A piston rod 166 is secured with a nut 168 to extend upwardly from the piston 158, passing out through a bushing 170. The datum ball 144 is attached to a reduced diameter section 172 of the rod 166.

A return spring 174 urges the piston 158 downwardly to retract the ball 144 whenever air pressure is not introduced via port 176 and selectively operable control valving (not shown).

Locating balls 178 are secured in pockets 180 formed in the upper face of the piston 158, while spaced pairs of locating rods 182 are attached at opposite locations to the inside face 184 of the end cap 148.

FIG. 5 shows that three equispaced locating balls 178 mate with three equispaced pairs of locating rods 182 to locate the piston in a plane and at a precise angular position.

The distance from the datum ball 144 to the table center of rotation is calibrated at constant ambient temperature of 20° C. In the event the equipment is used in an temperature environment other than a constant 20° C., the correspondence between the location of the datum ball 144 and the axis of rotation "a" of the table top 36 will change due to growth or shrinkage of the extension bracket 142 and table base 40.

Figure 6:
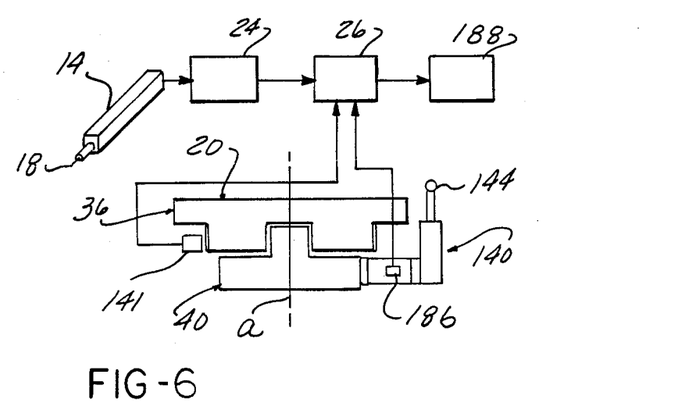
FIG. 6 is a diagrammatic representation of a temperature compensation circuit which may be employed with the datum ball cylinder installation.

FIG. 6 shows a diagram of a simple compensation system, which includes a temperature sensing transducer 186, such as a thermistor, sensing the temperature of the extension bracket 142 and base 40 and generating a corresponding electrical signal.

The temperature signal is processed in the computer 26 and modifies the values stored in memory 188 of the correspondence between the location of the datum ball 144 and the axis of rotation "a" of the table top plate 36.

In operation, a workpiece W is loaded onto the surface 20 of table top plate 36. The probe tip 18 is moved about to the points of interest on the workpiece W, with the dimensional values stored and/or displayed.

If it becomes necessary to probe an inaccessible surface of the workpiece W, air flow to the table air bearings is established to float the table top plate 36. Drive motor 62 is activated to rotate the table top plate 36 to an appropriate angular position, with this angular position determined by signals from transducer 141.

In the event the axis of rotation "a" must be referenced, the datum ball 144 is extended, and a reading is taken by the probe tip 18 to thereby determine the axis of rotation "a" of the table top plate 36.

I claim:

1. In combination, a coordinate measuring machine (10) having a probe tip (18) movable along three orthogonal axes (X,Y,Z) within a measuring envelop, distance transducers (24) generating electrical signals corresponding to said movement to enable measurements to be made by moving said probe tip (18) between points on a workpiece (W), a workpiece support table (12) having a top plate (36) supported on a table base (40), said table top plate (36) providing a supporting surface (20) for a workpiece (W) located within said measuring envelop to enable access by said probe tip (18), bearing means (116, 128, 136) supporting said table top plate for rotation about an axis (a) and drive means (38) for rotating said table top plate (36) about said axis characterized by:
 a retractable datum ball assembly (140) including a locating feature (144), means (142) fixing said datum ball assembly (140) relative to said table base (40) adjacent said table top plate (36), means (146) for selectively extending and retracting said locating feature (144) between an up position above said table surface (20) and within said measuring envelop and a down position below said table surface (20) and outside said measuring envelop, said locating surface (144) positioned to be accessible by said probe tip (18) when in said up position;
 and locating means (178, 182) acting on said datum ball assembly to locate said locating feature in space within said measuring envelop above said table in a predetermined, precisely repeatable relationship with said table axis of rotation whenever said locating feature is extended to said up position.

2. The coordinate measuring machine according to claim 1 wherein said means (146) for extending and retracting includes a vertically mounted power cylinder means having a piston (158) and a cylinder (146), said piston (158) mounted in a piston bore (160) in said cylinder (146) with a piston rod (166) attached to said piston (158), said piston rod (166) having a ball (144) attached comprising said feature (144).

3. The coordinate measuring machine according to claim 2 wherein said locating means (178, 182) acts between said piston (158) and said cylinder cap (148) with said piston (158) in said up position, to precisely locate said feature (144) in space above said cylinder (146).

4. The coordinate measuring machine according to claim 1 further including temperature sensor means (186) generating electrical signals corresponding to ambient temperatures, and means (26) to compensate for changes therein causing a change in correspondence between said datum feature (144) and the location of said axis of rotation (a) of said table top plate (36).

5. In combination, a coordinate measuring machine (10) having a probe tip (18) movable along three orthogonal axes (X,Y,Z), distance transducers (24) generating electrical signals corresponding to said movement along each axis to enable measurements to be made by moving a probe tip (18) between points on a workpiece (W), a workpiece support table (12) having a top plate (36) supported on a table base (40), said table top plate (36) providing a supporting surface (20) for a workpiece (W) located to enable access by said probe tip (18), bearing means (116, 128, 136) supporting said table top plate (36) for rotation about an axis (a) and drive means (38) for rotating said table top plate (36), characterized by said bearing means (116, 128, 136) comprising an air spindle (116) received in said table tip plate (36) rotatably guiding said table top plate (36) and air supply means (128) for introducing an air flow over said air spindle (116), and wherein said rotary drive means (38) includes a rotary drive member (72) rotatable about an axis of rotation parallel to said axis of rotation of said table and continuously forced laterally against a cylindrical perimeter surface (74) of said table top plate (36); and, a counterforce roller (98) rotatable about an axis parallel to the axis of rotation of said drive member continuously urged into engagement with said perimeter surface (74) at a diametrically opposite location from said rotary drive member (72).

6. The coordinate measuring machine according to claim 5 wherein said rotary drive member comprises a friction wheel (72) frictionally engaged with said perimeter surface (74).

7. The coordinate measuring machine according to claim 6 further including spring means (90, 92) for applying an adjustable spring force urging said drive member (72) into engagement with said perimeter surface (74) and spring means (100, 102) applying adjustable spring force urging said roller into engagement with said perimeter surface (74), said spring means (90, 92) also allows for slight radial movements to accommodate out of roundness in the drive surfaces.

8. In combination, a coordinate measuring machine (10) having a probe tip (10) movable along three orthogonal axes (X,Y,Z) distance transducers (24) generate electrical signals corresponding to said movement to enable measurements to be made by moving a probe tip (18) between points on a workpiece (W), a workpiece support table (12) having a ductile iron top plate (36) supported on a ductile iron table base (40), said table top plate (36) providing a supporting surface (20) for a workpiece (W) located to enable access by said probe tip (18), bearing means (116, 128, 136) supporting said table top plate for rotation about an axis (a) and drive means (38) for rotating said table top plate (36) characterized by a machine base (30) including a granite upper portion (32) and means for attaching said table base (40) to said granite upper portion (32) of said machine base (30), comprising a rotary connection (46) and block and cam follower connection (48) composed of elongated block (56) and straddling rollers (57) each mounted to either said table base (40) or said machine base granite upper portion (32) respectively at diametrically opposite locations on said machine base granite upper portion (32), whereby differential thermal growth between said table base (40) and said machine base granite upper portion (32) are accommodated.

9. A method of determining the axis of rotation of a table top plate (36) rotatably supported on a table base (40), said table top plate (36) having an upper surface (20) for supporting a workpiece (W) for measurement thereof within a measuring envelop defined above said table upper surface by a coordinate measuring machine (10) comprising the steps of fixing a datum feature (144) with respect to said base (40) by a bracket (142); determining the location of said feature relative to said axis of rotation (a); extending said datum feature above the level of said surface (20) when said axis of rotation (a) must be determined to an extended position precisely located in the space above said table within said measuring envelop, and measuring the location of said datum feature (144) at said extended position within said measuring envelop, to determine the location of said axis of rotation (a); and retracting said datum feature (144) out of said measuring envelop when measurements are being conducted on said workpiece (W).

10. The method according to claim 9 further including the steps of sensing the ambient temperature of said datum feature (144) and bracket (142), and compensating for changes in relationship between the location thereof and said axis of rotation (a) caused by changes in ambient temperatures.

* * * * *

UNITED STATES PATENT AND TRADEMARK OFFICE
CERTIFICATE OF CORRECTION

PATENT NO. : 4,958,438

DATED : September 25, 1990

INVENTOR(S) : Thomas L. Hemmelgarn

It is certified that error appears in the above-identified patent and that said Letters Patent is hereby corrected as shown below:

Abstract, line 3, after "ball" insert --locating feature--.

Column 2, line 51, delete "worktable" and insert --work piece support table--.

Column 2, line 56, after "work" insert --piece support--.

Column 2, line 64, after "table" insert --supporting--.

Column 3, line 7, after "rotary" insert --work piece support--.

Column 4, line 58, delete "the"(first occurance) and insert --a--.

Column 4, line 58, after "ball" insert --comprising a locating feature--.

Column 5, line 4, after "ball" insert --locating feature--.

Column 5, line 7, after "the" delete "ball" and insert --locating feature--.

Column 5, line 18, after "ball" insert --locating feature--.

Column 5, line 23, after "ball" insert --locating feature--.

Column 5, line 34, before "144" insert --locating feature--.

Column 5, line 35, after "the" insert --supporting--.

Column 5, line 46, after "ball" insert --locating feature--.

Column 6, line 3, after "table" insert --supporting--.

Column 6, line 4, after "said" delete "table" and insert --supporting--.

Column 6, line 21, after "said" insert --locating--.

UNITED STATES PATENT AND TRADEMARK OFFICE
CERTIFICATE OF CORRECTION

PATENT NO. : 4,958,438

DATED : September 25, 1990

INVENTOR(S) : Thomas L. Hemmelgarn

It is certified that error appears in the above-identified patent and that said Letters Patent is hereby corrected as shown below:

Column 6, line 26, after "said" (first occurance) insert --locating--.

Column 6, line 33, after "said" delete "datum" and insert --locating--.

Column 8, line 5, after "upper" insert --supporting--.

Column 8, line 9, after "(10)" insert --,--.

Column 8, line 9, after "datum" insert --locating--.

Column 8, line 12, after "datum" insert --locating--.

Column 8, line 16, after "datum" insert --locating--.

Column 8, line 18, after "envelop" delete ",".

Column 8, line 20, after "datum" insert --locating--.

Signed and Sealed this

Eighteenth Day of February, 1992

Attest:

HARRY F. MANBECK, JR.

*Attesting Officer*   *Commissioner of Patents and Trademarks*